Dec. 8, 1931.  E. J. DELAHANTY  1,835,698
SUPPORTING STRUCTURE
Filed April 11, 1929

INVENTOR
EDWARD J. DELAHANTY.
BY
ATTORNEY

Patented Dec. 8, 1931

1,835,698

UNITED STATES PATENT OFFICE

EDWARD J. DELAHANTY, OF DETROIT, MICHIGAN, ASSIGNOR TO CHRYSLER CORPORATION, OF DETROIT, MICHIGAN, A CORPORATION OF DELAWARE

SUPPORTING STRUCTURE

Application filed April 11, 1929. Serial No. 354,192.

This invention relates to new and useful improvements in supports and is particularly adapted to a support for a radiator on a motor vehicle.

An important object of the invention is to provide a resilient supporting and securing means for a radiator on a motor vehicle.

Another object of the invention is to provide a resilient supporting means carried by the radiator shell adapted to be secured to the frame of a motor vehicle, the parts being quickly detachable from the radiator shell or from the vehicle frame.

Other objects and advantages of the invention will be more apparent from the following description and claims taken in connection with the accompanying drawings, in which:

Figure 1:
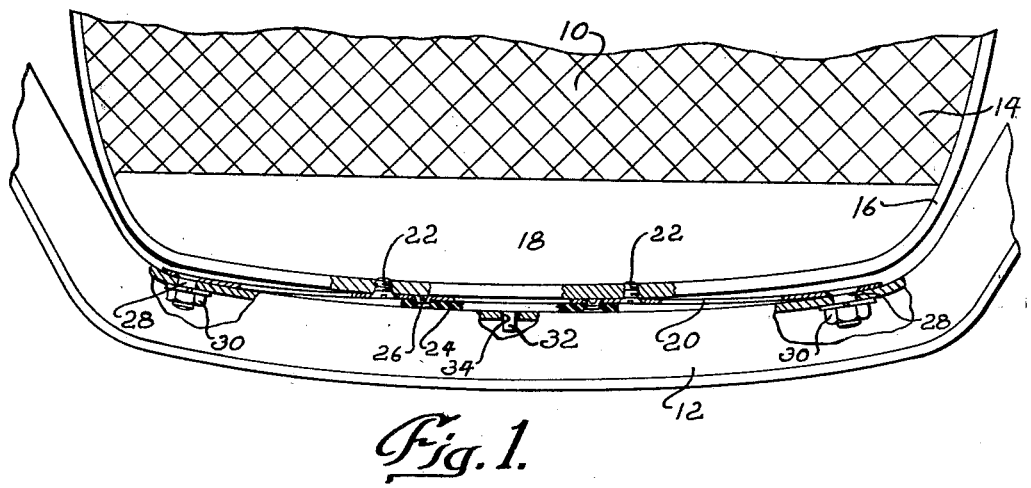
Fig. 1 is a fragmentary view of the lower end of a radiator and frame, parts being broken away and in section.
Figure 2:
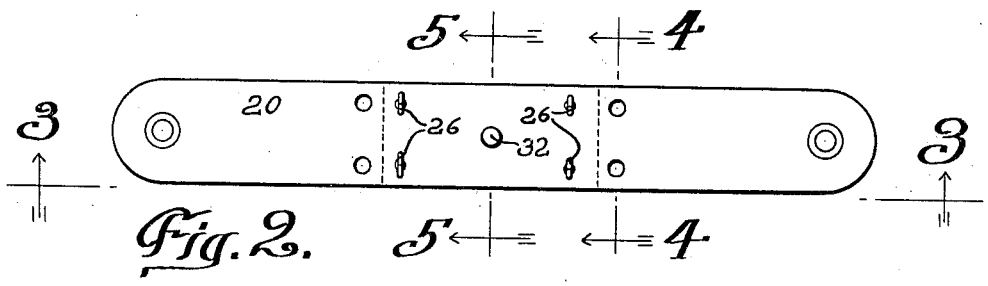
Fig. 2 is a plan view of the radiator supporting member.
Figure 3:
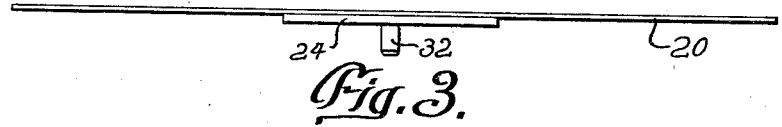
Fig. 3 is a side elevation of Fig. 2.
Figure 4:
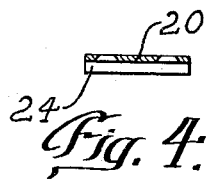
Fig. 4 is a sectional view on line 4—4 of Fig. 2.
Figure 5:
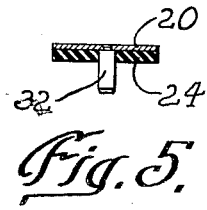
Fig. 5 is a sectional view on line 5—5 of Fig. 2.

Referring to the drawings wherein I have illustrated a preferred embodiment of my invention, the reference numeral 10 designates a radiator adapted to be secured to and supported on a cross frame membr 12 of a motor vehicle. The radiator 10 comprises a core section 14, outer shell 16 and lower tank 18.

On the lower surface of the shell 16 I have detachably secured a resilient strap like member 20 by screws 22. On the lower surface of the member 20 I have provided a resilient pad 24, preferably of rubber, secured to the member 20 by any suitable means, such as rivets 26, extending through the pad 24 and the member 20. The pad 24 has its opposite ends terminating adjacent the center of the member 20 and does not extend the full length of the member 20. The opposite ends of the member 20 are detachably secured to the frame 12, such as by bolts 28. The bolts 28 may be secured in the ends of the member 20 such as by welding, if desired, and the nuts 30 being screw threaded onto the bolts 28 from the under side of the frame member 12.

The member 20 is preferably made of spring steel and when it is in normal position it conforms to the contour of the lower surface of the shell 16. The resilient member 24 spaces the radiator and member 20 from the frame member and when the opposite ends of the member 20 are brought into contact with the frame 12 it will be apparent that the member 20 is under tension and its opposite ends are spaced from the radiator shell 16.

At the center of the member 20 I have provided a pin 32 which is received in an elongated opening 34 in the frame member 12. This pin serves the purpose of centering the resilient member on the member 24 as well as any shims which might be added to raise the radiator from the frame. The pin 32 is attached to the member 20 and extends through the resilient padding 24.

It will be understood that the radiator is free for limited movement in a vertical direction by the resiliency of the pad 24 and is also free for slight angular movement, the lower surface of the shell 16 rolling on the member 20. The radiator is securely held to the frame by the bolts 28 and screws 22 through the member 20.

Various changes, including the size, shape and arrangement of parts, may be made without departing from the spirit of my invention, and it is not my intention to limit its scope other than by the terms of the appended claims.

What I claim is:

1. In a support, the combination of a resilient member, a resilient pad adjacent the center of said resilient member and extending longitudinally thereof throughout only a limited part of the length of said member, a part to be supported, means for securing the resilient member adjacent its center to said part to be supported, a support, and means for securing the opposite ends of said resilient member to said support, said resilient pad being between said resilient member and said support and located centrally with respect to the part to be supported so as to permit rocking thereof with respect to said support against the action of the resilient member.

2. In a support, the combination of a resilient strap like member, a part to be supported, a support spaced from said part to be supported, means adjacent the center of said strap like member for securing it to said part to be supported, means for securing the opposite ends of said strap like member to said support, and a resilient pad adjacent the center of said strap like member between the latter and its support said pad being substantially shorter in length than said strap-like member and adapted to form a bow in said strap-like member so as to tension the same.

3. In a radiator support, the combination of a radiator, a support, a resilient strap like member secured to the lower surface of the radiator, adjacent its center, means remote from the center of said radiator for rigidly fixing the ends of said strap like member directly to said support, and means adjacent the center of said radiator spacing said strap like member from said support and tensioning the strap-like member between said rigidly secured portions.

4. In a radiator support, the combination of a radiator frame, a support, a resilient strap like member, a resilient pad carried by the central portion of said strap, a pin carried by said strap like member projecting through said resilient pad, means at the opposite ends of said pad for securing said strap like member to said radiator frame, and means for securing the opposite ends of said strap like member to said support, said resilient pad between said strap like member and said support.

5. In combination, a support, a spaced member to be supported, a resilient element secured at its intermediate portion to said member and at its end portions to said support, and a yieldable cushioning member located between only the central portions of said support and said resilient element normally bowing the latter upwardly so as to tension the respectively opposite end portions of said resilient element.

6. In combination, a support, a spaced member to be supported, a resilient element secured at its intermediate portion to said member and at its end portions to said support, a yieldable cushioning member located between only the central portions of said support and said resilient element allowing relative vertical movement between said member and said support, and means on said resilient element coacting with said support for guiding the relative vertical movement of the latter and said member.

7. In combination, a support, a spaced member to be supported, a resilient element secured at its intermediate portion to said member and at its end portions to said support, a yieldable cushioning member located between only the central portions of said support and said resilient element normally bowing the latter upwardly so as to tension the respectively opposite end portions of said resilient element, said cushion being adapted to permit relative vertical movement of said support and member, and means on said resilient element coacting with said support for guiding the relative vertical movement of the latter and said member.

8. In combination, a member to be supported having an arcuately shaped lower side, a supporting member therefor having a correspondingly shaped upper side, a resilient connecting element located between the arcuately shaped sides of said radiator and support respectively extending longitudinally thereof, the end portions of said connecting element being rigidly secured to one of said members and the central portion of said connecting element being secured to the other member, and yieldable means located between only the central portions of said connecting element and the central portions of the member to which the ends of said element are secured so as to form a fulcrum for the supported member.

9. In combination, a radiator having an arcuate shaped lower side, a support therefor having a correspondingly shaped side, a resilient connecting element located between the arcuate shaped sides of said radiator and support respectively extending longitudinally thereof, and a yieldable cushion substantially shorter than said element located between the central portions thereof and said support, the end portions of said element being bowed in a reverse curvature with respect to the arcuate side of said radiator and secured to said support.

10. In combination, a radiator having an arcuate shaped lower side, a support therefor having a correspondingly shaped side and having an aperture therein, a resilient connecting element located between the arcuate shaped sides of said radiator and support respectively extending longitudinally thereof, a yieldable cushion between the central portions of said element and said support, the end portions of said element being bowed in a reverse curvature with respect to the arcuate side of said radiator and secured to said support, and a pin on said resilient connecting element slidably engaged in the aperture of said support.

11. In combination, a support having an aperture therein, a spaced member to be supported, a resilient element secured at its intermediate portion to said member and at its end portions to said support, a yieldable cushioning member located between said support and said resilient element normally bowing the latter upwardly so as to tension the respectively opposite end portions of said resilient element, and a pin on said resilient member engageable in the aperture of said support for guiding the movement of said spaced member.

EDWARD J. DELAHANTY.